(12) United States Patent
Kornecki

(10) Patent No.: US 8,176,991 B1
(45) Date of Patent: *May 15, 2012

(54) POWERED ROLLING AND CRIMPING DEVICE FOR CROP TERMINATION

(75) Inventor: Ted S. Kornecki, Auburn, AL (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/698,604

(22) Filed: Feb. 2, 2010

(51) Int. Cl.
A01B 49/02 (2006.01)

(52) U.S. Cl. .......................... 172/175; 172/180; 172/68

(58) Field of Classification Search .................. 172/175, 172/180, 518, 195, 520, 551, 68
See application file for complete search history.

(56) References Cited

U.S. PATENT DOCUMENTS

| | | | |
|---|---|---|---|
| 4,208,151 A | 6/1980 | Cross | |
| 4,813,489 A | 3/1989 | Just et al. | |
| 4,947,770 A | 8/1990 | Johnston | |
| 5,531,171 A | 7/1996 | Whitesel et al. | |
| 6,769,495 B1 * | 8/2004 | Van Loen | 172/19 |
| 6,968,907 B1 | 11/2005 | Raper et al. | |
| 7,063,169 B2 * | 6/2006 | Elliott | 172/445.1 |
| 7,198,295 B2 * | 4/2007 | Biziorek et al. | 280/762 |
| 7,562,517 B1 * | 7/2009 | Kornecki | 56/504 |
| 7,604,067 B1 * | 10/2009 | Kornecki et al. | 172/175 |
| 7,644,779 B1 * | 1/2010 | Templeton et al. | 172/42 |
| 7,987,917 B1 * | 8/2011 | Kornecki | 172/554 |
| 2003/0056961 A1 | 3/2003 | Jones | |

* cited by examiner

Primary Examiner — Robert Pezzuto
Assistant Examiner — Jamie L McGowan
(74) Attorney, Agent, or Firm — John D. Fado; Robert D. Jones

(57) ABSTRACT

The powered rolling and crimping device is used to terminate cover crops in a minimum tillage soil conservation system. The device includes a powered crimping mechanism in combination with a crop roller. Power is transferred from a tractor power takeoff to a plurality of cam mechanisms via mechanical gearbox. The cam mechanisms raise and lower a crimping bar. As an operator directs a walk-behind tractor across a field of cover crops, a crop roller first flattens the crops and the powered crimping bar crimps the crops, thereby terminating the cover crops without severing the crop stalks disturbing the soil.

18 Claims, 1 Drawing Sheet

U.S. Patent May 15, 2012 US 8,176,991 B1
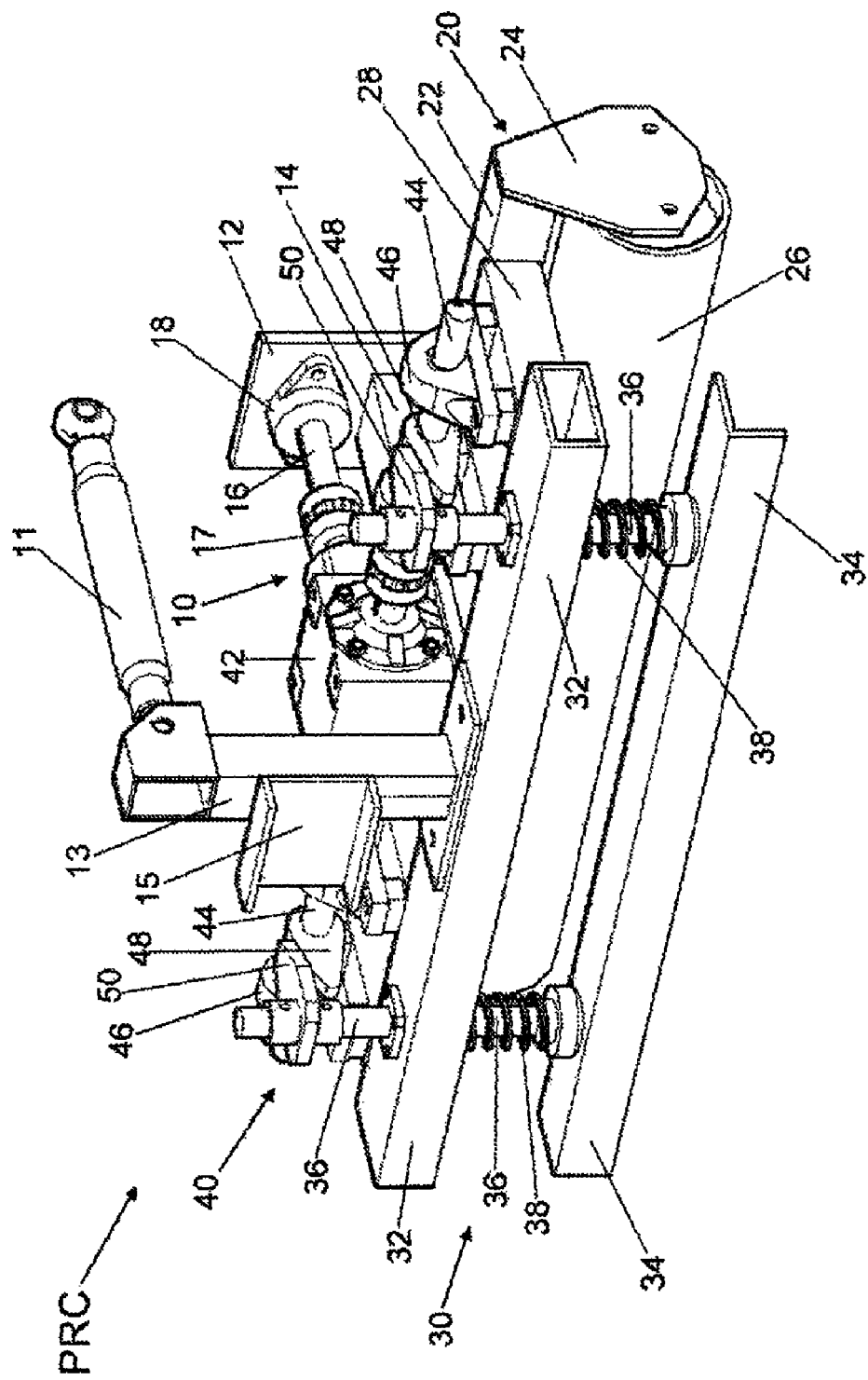

POWERED ROLLING AND CRIMPING DEVICE FOR CROP TERMINATION

The present invention relates to a system and method for mechanically terminating cover crops. Specifically, the current invention relates to a powered rolling and crimping device designed to roll over and crimp crops.

BACKGROUND OF THE INVENTION

Cover crops are an important part of most no-till soil conservation systems, but they must to be managed correctly to fully realize their potential benefits. Among other things, these benefits include a reduction in soil erosion and the suppression of weed pressure.

At the end of a selected cover crop-growing cycle, the cover crops are terminated so that a selected newly planted crop can emerge and thrive. Termination of the cover crop allows the new selected crops to fully benefit from the soil conditioning properties of the terminated cover crops without competing with the cover crops for water and nutrients.

In the past, herbicides were the preferred means of terminating cover crops, primarily because the herbicide application process is relatively fast and effective. Although herbicide application effectively kills the cover crops, there may be problems associated with unintended over-spray, spray drift, and undesirable chemical run-off. The herbicides also leave the cover crop stalks in tact. The stalks and associated crop residue subsequently interfere with the planting process associated with the new crops, particularly for cover crops (such as rye) that generate a large amount of biomass. Further, the use of herbicides is prohibited for farmers that intend to market their corps as "organically grown".

Rolling and crimping devices have been developed to destroy and mulch the cover crops and thereby address these issues. These devices generally require large conventional tractors to tow the rollers and/or crimpers across the cover crops. However, these large tractors are not practical for small-scale organic framers (particularly vegetable farmers) who could benefit from the use of no-till soil conservation practices.

The need exists for a roller/crimper system compatible with smaller scale organic farming operations. The current invention provides a rolling and crimping device that is designed to work with the small, inexpensive walk-behind garden tractors that are popular with small-scale organic farmers.

SUMMARY OF THE INVENTION

The current invention is directed to a powered rolling and crimpling device. The device comprises a power source that provides power to a lifting assembly. In the preferred embodiment, power is provided by the power takeoff portion of a conventional walk-behind type garden tractor and the lifting assembly comprises a cam assembly. A crimping bar is connected to the lifting assembly so that the cam assembly controls the crimping bar. The powered rolling and crimping device also includes a crop roller that precedes the crimping bar during the crimping and rolling process.

In operation, as the rolling and crimping device is propelled across a field of cover crops, the crop roller rolls over the crops and the crimping bar crimps the crops, thereby terminating the cover crops and preparing the field for planting the next cycle of crops.

The current invention also includes a method of terminating cover crops. The method includes providing a power source and transferring torque from the power source to a gearbox on a crop rolling and crimping device. The torque is then directed from the gearbox to a plurality of cam mechanisms that are connected to a crimping bar. A crop roller is positioned in front of the crimping bar. The crops are terminated by propelling the crop rolling and crimping device across a field of crops so that the crop roller rolls over the crops and the crimping bar crimps the crops, thereby terminating the crops and preparing the crop field for planting the next cycle of crops.

BRIEF DESCRIPTION OF THE DRAWINGS

FIG. 1 is a top perspective view current invention.

DETAILED DESCRIPTION OF PREFERRED EMBODIMENTS

The powered rolling and crimping device PRC of current invention is generally shown in FIG. 1. In the preferred embodiment, the powered roller/crimper PRC is designed to be attached to and pulled by a conventional walk-behind tractor. Typical examples of these types of tractors are manufactured by DR, Troy-Built, and BCS. For the purposes of the current invention, a walk-behind tractor is a tractor that does not accommodate a riding operator so that the operator walks behind the tractor and guides the tractor with a linkage that may include handlebars, hand grips, or the like.

In the preferred embodiment, the tractor power takeoff extends rearward from the back of the tractor so that the powered rolling and crimping device PRC engages the power takeoff and is towed behind the tractor in a "tow configuration". FIG. 1 shows the PRC device in the tow configuration. However, in alternative embodiments, the tractor power takeoff may extend forward from the front of the tractor so that the current invention also has a front-mounted "push configuration". In the push configuration the PRC device extends out in front of the tractor so that the tractor pushes the PRC device. The push configuration enables an operator to access corners and tight spots that would otherwise be inaccessible.

As generally shown in FIG. 1, the powered rolling and crimping device PRC comprises a linkage assembly 10. The linkage assembly 10 includes a mounting plate 12 and a base connecting member 14 as well as a drive shaft 16 with a flexible coupler 17. The linkage assembly 10 also includes a dynamic stabilizing device 11 and a vertical stabilizing member 13.

As shown in FIG. 1, the mounting plate 12 bolts to a power takeoff housing of a tractor. A drive shaft stabilizer flange 18 bolts to the mounting plate 12. The drive shaft 16 extends through the mounting plate 12 and stabilizer flange 18, and meshes with the splines of the tractor power takeoff shaft. The dynamic stabilizer device 11 has a first end that is connected to the tractor and a second end connected to the vertical stabilizing member 13. A mounting bracket 15 for auxiliary wheels extends rearward from the vertical stabilizer. The auxiliary wheels enable a user to more easily maneuver the PRC device for transportation and storage. In the preferred embodiment, the dynamic stabilizer device 11 is a shock absorber that further stabilizes the PRC device and relieves stress on the tractor power takeoff assembly and drive shaft 16.

The linkage assembly 10 is connected to a roller assembly 20. The roller assembly 20 comprises the crop roller frame support member 22, endplates 24, and a crop roller 26. The linkage assembly 10 base connecting member 14 extends to the roller assembly 20 crop roller frame support member 22.

In the preferred embodiment, an axle (not shown) extends from each end of the crop roller 26. End portions of the axle nest in a bearing assembly on the inner side of each of the end plates 24 so that the axle turns in the bearing assemblies.

In the preferred embodiment, the crop roller component 26 comprises a smooth cylindrical roller. In alternative embodiments, the cylindrical roller 26 may include straight or angular projections that crimp the crops as the roller 26 is towed behind the tractor. In further alternative embodiments a plurality of crop rollers 26 may be incorporated into a single powered rolling and crimping device PRC.

In the preferred embodiment, the base connecting member 14 extends further away from the tractor to a crimping assembly 30. the crimping assembly 30 primarily comprises a stationary support beam 32 and a movable crimping bar 34. The crimping assembly 30 stationary support beam 32 is connected to the crop roller frame support member 22 by the base connecting member 14 and a plurality of horizontally extending stabilizers 28. The stationary support beam 32 is also connected to the vertical stabilizing member 13. A pair of vertically oriented crimping member control rods 36 extend through the stationary support beam 32 to the crimping bar 34. A helical compression spring 38 encircles each of the crimping member control rods 36 and maintains the crimping bar 34 in the extended position.

The crimping bar 34 is raised and lowered by a crimping bar lifting assembly 40. In the preferred embodiment, the crimping bar lifting assembly 40 essentially comprises a gearbox 42, a pair of output power shafts 44, and at least one cam lobe 48 mounted on each output power shaft 44. The gearbox 42 is mounted on the aft portion of the base connecting member 14. The gearbox 42 receives input torque from the driveshaft 16 and distributes the torque to the two output power shafts 44 that extend latterly from the gearbox 42. The output power shafts 44 are secured and supported by a plurality of shaft support flanges 46. The shaft support flanges 46 are mounted on the horizontal stabilizers 28 that connect the crop roller base frame member 22 with the stationary support beam 32.

A cam lobe 48 is attached to each output power shaft 44 between two of the respective shaft support flanges 46. As the output power shafts 44 rotate, the periphery of the cam lobes 48 engages cam followers 50 that extend horizontally from a top portion of each of the crimping bar control rods 36. As each cam lobe 48 rotates, the associated cam follower 50 travels upwardly along the periphery of the ramp portion of the cam lobe 48.

When the cam followers 50 reach the nose portion of the respective cam lobes 48, the crimping bar 34 is in the fully raised position and the helical compression springs 38 are fully compressed. As the cam followers 50 pass over the nose portion of associated the cam lobes 48, the helical compression springs 38 drive the crimping bar 34 downwardly so that the crimping bar 34 crimps the target cover crops. As the output power shafts 44 and associated cam lobes 48 continue to rotate, the cycle repeats itself as the cam followers 50 once again travel upwardly along the ramp portion of each of the respective cam lobes 48.

As discussed supra, the current invention also includes an alternative embodiment (i.e. a push configuration) wherein the PRC device is disposed in front of the walk-behind tractor so that the tractor pushes the PRC device. In the alternative embodiment, the gearbox 42 and linkage assembly 10 are rotated 180 degrees to extend rearward and the vertical stabilizing member 13 is relocated to avoid interference with the linkage assembly 10. Other aspects of the invention are essentially unaffected by the modification.

In operation, the mounting plate 12 is bolted to the tractor power takeoff housing so that the tractor power takeoff engages the drive shaft 16. The drive shaft 16 provides input power to the gearbox 42. The gearbox 42 rotates laterally extending power output shafts 44. Cam lobes 48 mounted on the power output shafts 44 engage corresponding cam followers 50. The cam followers 50 are attached to crimping bar control rods 36 that essentially raise and release a crimping bar 34.

As the tractor propels the powered rolling and crimping device across a field, targeted cover crops are first flattened by the crop roller 26 and then crimped by the crimping bar 34. The combination of the rolling and crimping action of the powered roller crimper PRC destroys the cover crop without cutting or uprooting the cover crop stalks.

In the preferred embodiment, the number of crimping cycles per unit of time is a direct function of tractor power takeoff rotary speed (for example power takeoff revolutions per minute (rpm)). At a constant power takeoff rpm, if a user increases the ground speed that the device is propelled across a field, the number of crimping cycles per linear foot is decreased. If the user decreases his speed, the number of crimping cycles per linear foot is increased. This arrangement allows a user to vary his horizontal travel speed to apply more crimping cycles to areas of a filed in which cover crop growth has the greatest density. A change in the gearing of a tractor power takeoff transmission (if equipped with a transmission) will increase or decrease the crimping rate by increasing or decreasing the power takeoff rpm.

In alternative embodiments, the power takeoff transmission may receive input from the tractor wheels so that the PRC device delivers (for example) a specified number of crimping cycles per linear foot of travel. In further alternative embodiments, the PRC gearbox 42 may be modified so that the gearbox 42 comprises a selectable-speed transmission. In this embodiment, the PRC device crimping revolutions are selectable by a user independent of the tractor power takeoff rpm.

For the foregoing reasons, it is clear that the current invention provides an innovative means of destroying a cover crop. The invention may be modified in multiple ways and applied in various technological applications. The current invention may be customized as required by a specific operation or application, and the individual components may be modified and defined, as required, to achieve the desired result.

For example, although the preferred embodiment is intended for use with a walk-behind tractor, in alternative embodiments the scale of the components may be increased or decreased. An implement with the design described herein may be used with other types of powered devices including conventional riding-type farm tractors as well as devices that would not conventionally be considered to be "tractors". Such variations are not to be regarded as a departure from the spirit and scope of the invention, and all such modifications as would be obvious to one skilled in the art are intended to included within the scope of the following claims.

What is claimed is:

1. A powered rolling and crimping device, the device comprising:
   a power source;
   a lifting assembly receiving power from the power source;
   the lifting assembly comprising:
   (a) a gearbox receiving power from the power source;
   (b) at least one output shaft receiving power from the gearbox; and
   (c) at least one cam mechanism mounted on the output shaft;

a crimping bar connected to the lifting assembly, the cam mechanism raising and lowering the crimping bar;

a crop roller operatively connected to the crimping bar and the lifting assembly;

whereby as the powered rolling and crimping device is propelled across a field of crops, the crop roller rolls over the crops and the crimping bar crimps the crops.

2. The powered rolling and crimping device of claim 1 wherein the power source comprises a tractor power takeoff.

3. The powered rolling and crimping device of claim 2 wherein the tractor comprises a walk-behind tractor.

4. The powered rolling and crimping device of claim 1 wherein the gearbox transmits power to two oppositely disposed output power shafts, a cam mechanism being mounted on each of the output power shafts.

5. The powered rolling and crimping device of claim 4 further comprising at least two cam followers so that each cam follower engages one of the cam mechanisms, the cam followers being configured so that as each cam mechanism rotates, a nose of the cam mechanism lifts the cam follower which, in turn, lifts the crimping bar.

6. The powered rolling and crimping device of claim 5 further comprising at least two crimping bar control rods, each crimping bar control rod having a first end attached to one of the cam followers, and a second end attached to the crimping bar, each of the crimping bar control rods being encircled by a helical compression spring.

7. The powered rolling and crimping device of claim 6 wherein after the cam mechanism rotates past the nose portion of the cam mechanism, the helical compression spring urges the crimping bar downwardly away from the cam mechanism.

8. The powered rolling and crimping device of claim 7 further comprising:

a crop roller frame support member connected to the crop roller, and a base connecting member extending through the crop roller frame support member and connecting the crop roller frame support member to the power source, the gearbox being mounted on the base connecting member.

9. The powered rolling and crimping device of claim 8 further comprising a stationary support beam, the stationary support beam being connected to the base connecting member.

10. The powered rolling and crimping device of claim 9 wherein the stationary support beam is connected to the crop roller frame support member via a plurality of horizontal stabilizers disposed in a horizontal plane between the stationary support beam and the crop roller frame support member.

11. The powered rolling a crimping device of claim 10 wherein the stationary support beam is disposed between the cam followers and crimping bar so that the crimping bar control rods pass through the stationary support member.

12. The powered rolling and crimping device of claim 11 wherein the helical compression springs are disposed between the stationary support beam and the crimping bar.

13. The powered rolling and crimping device of claim 12 wherein a first end of each of the helical compression springs is proximate the stationary support beam and a second end of each of the helical compression springs is proximate the crimping bar so that when the cam follower passes over the nose portion of the cam mechanism, the helical compression springs drive the crimping bar downwardly.

14. The powered rolling and crimping device of claim 1 wherein the device is designed to be operated by pushing the device across a field of crops so that the tractor is disposed behind the device.

15. A method of terminating cover crops, the method comprising the steps of:

(a) providing a power source to a crop rolling and crimping device;

(b) transferring power from the power source to a gearbox on the crop rolling and crimping device so that the gearbox receives torque from the power source;

(c) directing power from the gearbox to a plurality of cam mechanisms;

(d) connecting the cam mechanisms to a crimping bar so that the cam mechanisms lift and release the crimping bar;

(e) positioning a crop roller in front of the crimping bar on the crop rolling and crimping device;

(f) propelling the crop rolling and crimping device across a field of crops so that the crop roller rolls over the crops and the crimping bar crimps the crops, thereby terminating the crops.

16. The method of claim 14 wherein, in step (a), the power source is a tractor power takeoff.

17. The method of claim 14 wherein, in step (c), torque is directed from the gearbox to two oppositely disposed output power shafts, the cam mechanisms being mounted on each of the output power shafts.

18. The method of claim 14 wherein, in step (d), a compression spring drives the crimping bar downwardly as the cam mechanism releases the crimping bar.

\* \* \* \* \*